United States Patent Office 3,528,127
Patented Sept. 15, 1970

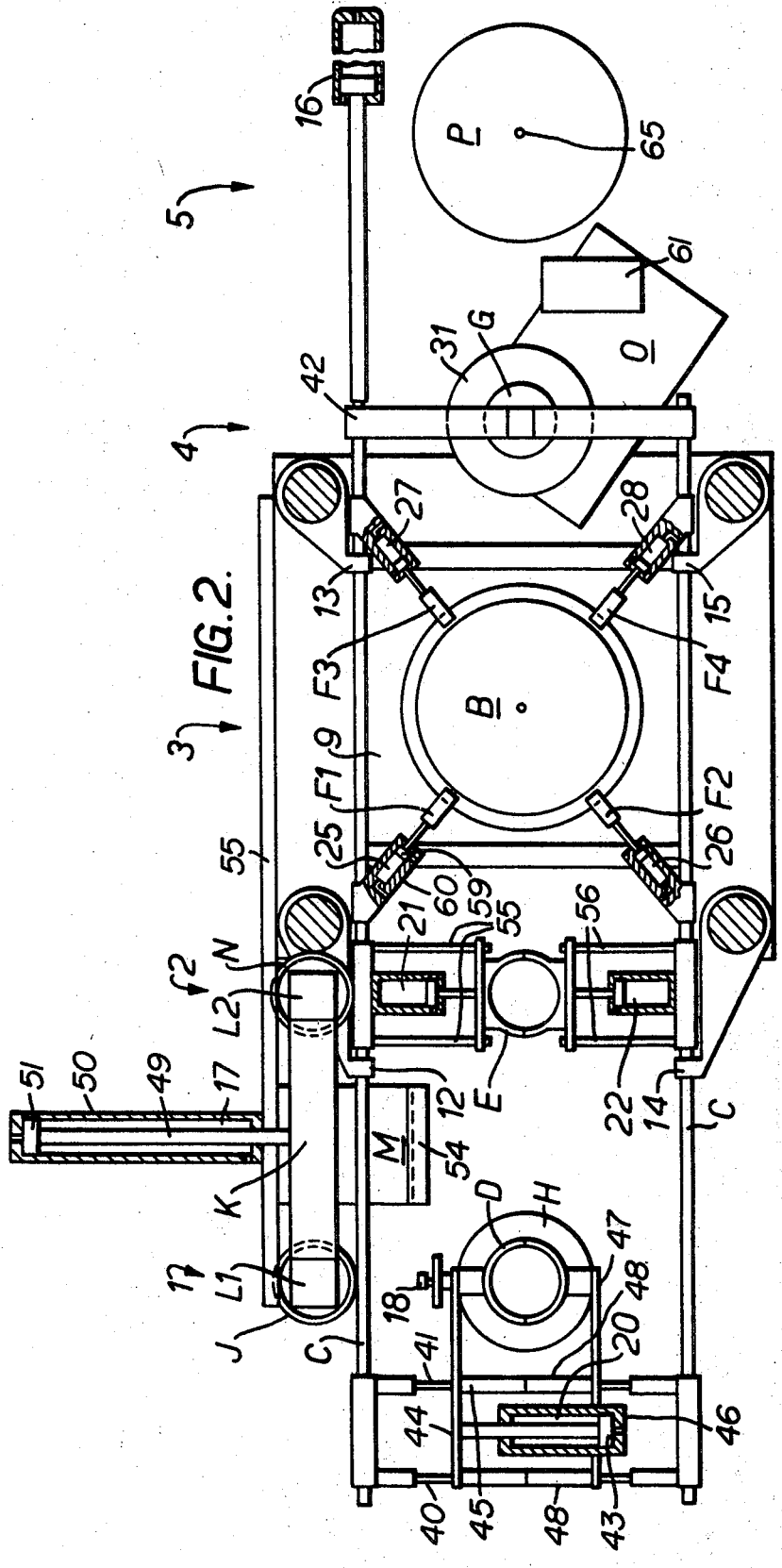

3,528,127
APPARATUS FOR THE AUTOMATIC PRODUCTION OF GRAMOPHONE RECORDS
Kurt Damm, Hurth-Hermulheim, Hermann Strausfeld, Cologne-Ehrenfeld, Werner Krahn, Lovenich near Cologne, and Theodor Kronchen, Porz-Langel, Germany, assignors to Carl Lindstrom Gesellschaft m.b.H., Cologne-Braunsfeld, Germany, a company of Germany
Filed Feb. 24, 1967, Ser. No. 618,410
Claims priority, application Germany, Mar. 5, 1966, L 53,024
Int. Cl. B29d 17/00
U.S. Cl. 18—5.3         10 Claims

ABSTRACT OF THE DISCLOSURE

The disclosure relates to apparatus for the automatic production of gramophone records. The apparatus comprising a moulding material supply source, a record moulding press, and a record edge trimming device arranged in line. Two longitudinal reciprocating slides are supported respectively at the front and rear of the apparatus and they carry transfer means in such locations that the forward stroke of the slides causes a first of the transfer means to deliver to the press a quantity of mouldable material obtained from the source, causes a second transfer means to transfer a record from the press to the trimming device, and causes a third transfer means to transfer a trimmed record from the trimming device to a delivery station. The return stroke of the slides restores the three transfer means to initial positions in readiness for the manufacture of another record. The press includes upper and lower moulds both of which are moved toward and away from each other to close and open the press and the second of the transfer means comprises four grabs disposed at angularly spaced positions around the press. The moulds of the press when closed are arranged to mould a record substantially in the plane of the grab devices so that they can seize the flash.

Figure 1:
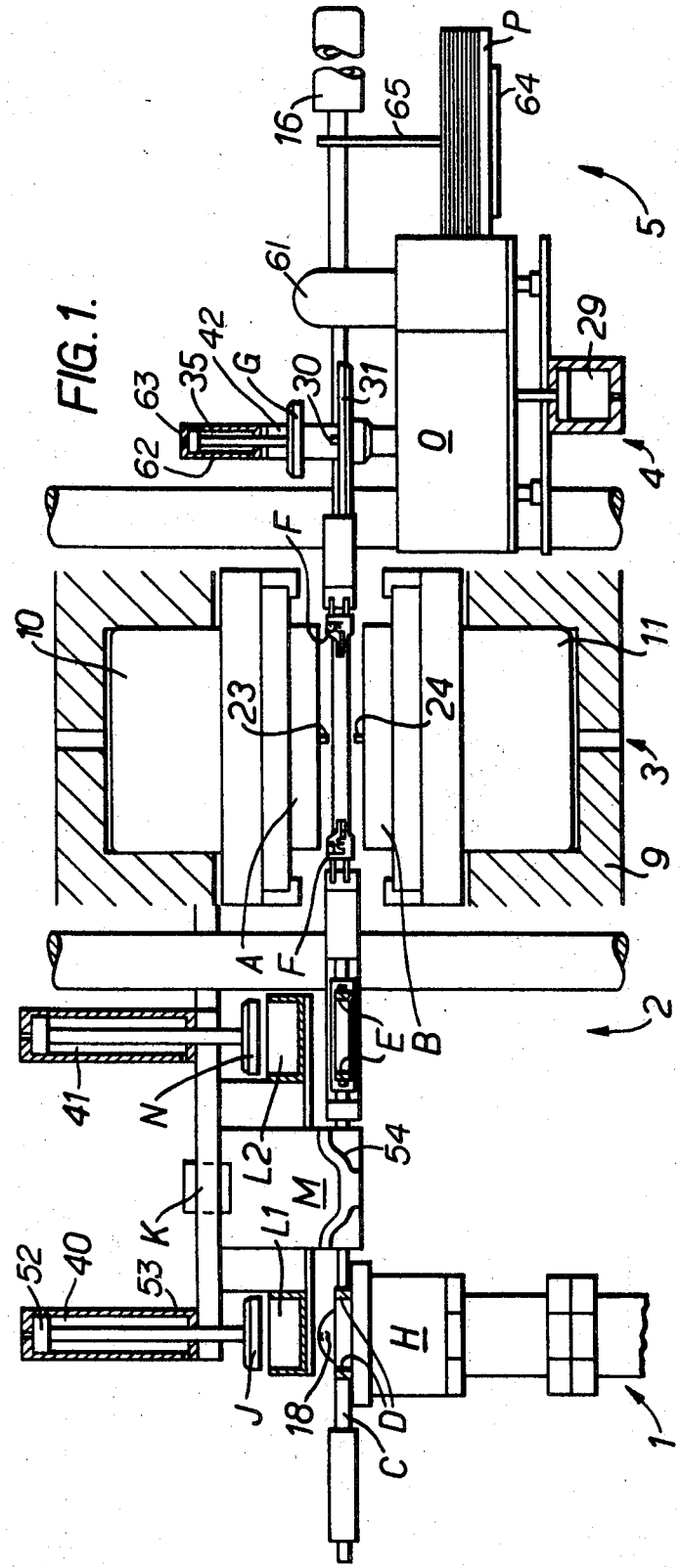

This invention relates to apparatus for the automatic production of gramophone records.

In order that the present invention may be clearly understood and readily carried into effect, one embodiment thereof will now be described, by way of example only, with reference to the accompanying drawings of which:

FIG. 1 is a side view partly in section of apparatus for the automatic production of gramophone records in accordance with the invention, and FIG. 2 is a plan view, also partly in section, of the apparatus shown in FIG 1.

Referring to the drawings, the gramophone record is formed in a compression moulding press 9. The moulding operation is carried out by moving both the upper mould A and the lower mould B together respectively by means of pistons 10 and 11, so that each mould travels approximately the same vertical distance in opposite directions during the pressing operation. The level at which the record is moulded will be defined throughout the apparatus as the product path, and is approximately the level at which at least the record is removed from the press and transferred to the trimming station. The term product will be employed to refer in general to the material to be moulded or the moulded material at any stage of production from an initial predetermined quantity of mouldable material to the final finished record.

Two longitudinal slide bars C extend along the length of the apparatus at about the same level as the production path. Each of the slides C are guided by respective pairs of guides 12, 13 and 14, 15, which are securely mounted on the apparatus frame. The slides C are mechanically linked togther by cross members such as 40, 41 and 42 and are moved first to the right and then back to the left by a hydraulic mechanism 16 in a predetermined repetitive rhythm, the mechanism 16 consisting as shown of a piston in a cylinder.

A plurality of operating means, for operating on the product, are situated at five stations, numbered respectively 1, 2, 3, 4 and 5, which are equally spaced along the production path. A plurality of transfer means are fixedly mounted on the slides C and spaced apart by distances equal to the distance between one station and the next. The transfer means comprise respectively, two pairs of separable half rings or claws D and E, a system of four grabs $F_1$, $F_2$, $F_3$, and $F_4$ and a vacuum grab G. The hydraulic mechanism 16, when operated, is arranged to move the slides C, and transfer means attached thereto, by a distance equal to the distance between one station and the next, and after the respective transfer means have all released the respective product, the mechanism 16 moves the slides C back to their original position. The operation of the mechanism 16 is initiated as soon as each one of the operating means along the production path has completed the respective operation on the respective product presented to it, which operations are normally arranged to occur concurrently, and each transfer means has a satisfactory grasp on the product present at the respective station. The two extreme positions of the slides will be termed the left-hand and right-hand positions respectively, the right-hand position being that in which the slides are shown in FIG. 1.

At the beginning of the production path, denoted by station 1, there is located a dispensing means H of known kind. When the slides C are in their left hand position, a predetermined quantity of mouldable material, which has been rendered plastic by the application of heat thereto, is injected by the dispenser H into the space formed by the two semi circular claws of the transfer device D which are held closed to form a ring by the pneumatically operated mechanism 20. The inside diameter of the claws of D is made the same as that of the record label.

The mechanism 20 consists of an air piston 43 carrying an arm 44 which bears one of the claws D, the arm 44 carrying sleeves 45 which slide on the cross members 40 and 41. The piston 43 fits in a cylinder 46 which carries a second arm 47 bearing the other claws D, the arm 47 carrying sleeves 48 which slide on the cross members 40 and 41. The operation of the mechanism 20 causes the claws D to move apart by equal distances or come together depending on the point in the cycle of operation of the apparatus. The claws D are pivotally mounted on the arms 44 and 47 so that they can rotate about an axis in the plane of the slides C and transverse to the slides. This enables the product held by claws to be turned upside down. Eccentric cam follower means 18 are attached to the claws and when slides C are moved to and fro, the follower means 18 engage in a cam track M formed on the plate attached to a frame 55 secured to the gramophone record press. Engagement of the follower means 18 in the cam track 54 causes the claws D to be turned through 180° each time the slides C are moved from left to right. The claws E are similar to the claws D but they are not rotatable. They slide on parallel rods 55 and 56 respectively fixed to the slides C. The claws E are operable so that they can be opened and closed by respective pneumatic mechanisms 21 and 22 consisting of pistons coupled to the claws and movable in respective cylinders.

A magazine for record labels for one side of the gramophone record is located to the side of the production path at station 1. A vacuum suction grab J is carried on a slide K, which in turn is connected by a rod 49 to a piston 50 in a cylinder 51 of a pneumatic mechanism 17.

The stroke of the piston 50 is such that at one end of the travel of the piston, the grab J is located above the claws D. The grab J is carried by a piston 52 in a cylinder 53 constituting a pneumatic mechanism 40. By means of the mechanism the suction grab J can be moved down either to take up a label from the magazine L1 when the slide K is retracted or to hold the label on top of the claws D when the slide K is moved forward. A magazine L2 for the other side of the gramophone record is located at station 2 at the side of the production path, in line with magazine L1. A second suction grab N, similar to the grab J is supported on the slide K to co-operate with the magazine L2, in the same way as grab J co-operates with the magazine L1. The suction grab N can be moved up and down by pneumatic mechanism 41 which is similar to the mechanism 40.

The gramophone record press B is located as shown at station B and this is a conventional press in which the hydraulically operated pistons 10 and 11 of the two moulds A and B are controlled by hydraulic flow divider so that the moulds A and B are moved together by equal distances to mould a record and are then moved apart by approximately equal distances to open the press after a record has been moulded. When the slides C are in their left hand positions the four grabs $F_1$, $F_2$, $F_3$, and $F_4$ are equi-angularly disposed about the vertical axis of the press. Each grab consists of a pair of grippers of known construction actuable so that they can be opened and closed by a pneumatic mechanism. The four mechanisms are denoted by the references 25 to 29 respectively and each consists as shown of a piston coupled to a respective gripper and movable in a cylinder, the piston and cylinder bearing the references 59 and 60 in the case of the mechanism 25. The position of the gripper is such that when open they can receive the flash which is extruded from the press when a gramophone record is moulded, and when closed can seize the flash. At station 4 is located record edge-cutting machine O which can be raised and lowered by a hydraulic ram 29. This cutting machine is of known construction and it is sufficient to indicate that it consists of turntable 31 having a centering pin 30 and rotatable cutting blades in a housing 61. The cutting mechanism is raised as the centering pin enters the centre hole of a record supported by the grabs $F_1$ to $F_4$, when the slides C are in their right hand position. The cross member 42 joining the slides C supports the cylinders 62 of a pneumatic mechanism 35. The piston 63 of this pneumatic mechanism is coupled to the vacuum grab G and when the slides C are in their left-hand position this vacuum grab G is located over the turntable 31 of the edge cutting machine O, and can be lowered to seize a record on the turntable and lift it therefrom. Finally, at station 5 is located record reception means P consisting of a table 64 having an upstanding post 65 onto which records can be threaded.

The pneumatic and vacuum mechanisms of the apparatus are connected to respective pneumatic and vacuum circuits by valve conduits. The valves are operated at appropriate times under control of timing mechanism in such a way as to cause the apparatus to perform repeatedly the sequence of operations described subsequently. The pneumatic and vacuum circuits also control the operation of diaphragm valves which control the hydraulic steam and water supplies to the extruder, press, and other hydraulically operated components. Such control circuits are commonplace in the gramophone record manufacturing art and may be of a variety of known constructions but suitable control circuits are described in the aforesaid United States Pat. No. 3,264,386.

The sequence of operations above referred to is as follows. The vacuum grab J is lowered on to the top label in the magazine L1. A vacuum suction grab J, carried by means of the pneumatically operated mechanism 40 and caused to pickup this label. The slide K is then pushed forward pneumatically by the mechanism 17 until the label, which has been pre-warmed, is held over the claw D, at which point the mechanism 40 causes the grab J to descend further so that the label is caused to form an upper closure for the space within the claws D. The label is pressed down on the predetermined quantity of mouldable material injected by the dispenser H, and causes the material to form a flat cake which adheres to the inside sides of the claw D and to the label thus completing the first operation. At this point the vacuum grab J is caused to release its hold of the label and subsequently returns to pick up the next label from the magazine $L_1$, ready for the next repetition.

Upon this operation and the corresponding completion of the operations at the other stations, the slide C is caused to move to the right taking with it the transfer claws D, which carries to the next station, 2, the product consisting of the mouldable material to one surface of which is attached a label. As the transfer claws D proceed from station 1 to station 2, a cam follower means 18 engages with the grooved track of the cam track M. The co-operation between the roller follower means 18 and cam M causes the claws D to turn over and the product arrives at station 2 with the surface to which the first label is attached, facing downwards.

Prior to this the vacuum grab N, which is also carried on the cross slide K, is caused to pick up a label from a second magazine $L_2$. As soon as the claws D arrive at station 2, the grab N is moved forward on the slide K and is caused to descend by the mechanism 41 so as to press the warmed label carried thereby, onto the upper surface of the product contained within the claws D, so that the label and mouldable material adhere together. At this point the claws D of the transfer mechanism are opened, by the operation of the pneumatic cylinder 20, while the vacuum is retained in the grab N. The vacuum is sufficient to support the mouldable material by means of the suction applied to the respective label, so that the mouldable material does not fall even though the claws D release their grip on the product.

The slides C are then driven back to the left by the mechanism 16. The two claws of the transfer mechanism E arrive at the station 2 held open by pneumatic cylinders 21 and 22 until the claws E are centered about the product held at station 2 by the vacuum grab N. Therefore the claws E are brought together to grasp the product which now comprises a cake of mouldable material with a label attached to the upper and lower surfaces thereof. The vacuum in the vacuum grab N are then released to allow the grab N to be withdrawn up to the rear so that it can be subsequently caused to pick up another label from the magazine $L_2$ in readiness for the next repetition.

When the slide C is again driven to the right, the claws E carry the cake into the middle of the space between the two moulds A and B situated at station 3. Thereupon, two centering pins 23 and 24 are caused to project from the surfaces of the moulds A and B in known manner so as to hold the cake, after which the claws E are opened, releasing the product. The return of the slide C to the left carries the claws E back to station 2. The press 9 is now operated. The two moulds A and B are pressed together by the hydraulically operated pistons 10 and 11 so that the moulds move together by an equal distance. In this way the moulds A and B which include pressure dies together with the centering pins 23 and 24, form a gramophone record with a central hole complete with a label attached to the upper and lower central portion, substantially at the level of the production path. Moulding material exudes from the outer edges of the mould to form the flash and this is caused to occur between the opened jaws of the four grabs $F_1$, $F_2$, $F_3$ and $F_4$, controlled by the pneumatic mechanisms 25, 26, 27 and 28. After the moulding process, the moulds are cooled, following the usual practice, by passing a cooling fluid through channels within the moulds A and B, and the flash is also cooled at the same time. Just before the moulds A and B are drawn apart in a symmetrical movement, the four grabs $F_1$, $F_2$, $F_3$ and $F_4$ are pneumatically closed by the mechanisms 25, 26, 27 and 28. They may be at the same time, pulled slightly in a direction outwards, away from the centre of the record, so that the flash is stretched, and on opening the press, this stress is transmitted to the record itself.

With the next movement of the slide C to the right, the four grabs $F_1$, $F_2$, $F_3$, $F_4$, carry the product, which is now the form of a gramophone record with the flash still attached, to the next station 4 at which the edge cutting operation is carried out.

The cutting machine O is raised by the ram 29, on the arrival of the record at station 4, so that the centering pin 30 of the turntable 31 engages the central hole of the newly pressed gramophone record. As soon as this has been carried out the grabs $F_1$, $F_2$, $F_3$, $F_4$ open, and move back clear of the record so that the record now rests on the turntable of the edge-cutting machine. The slide C now returns to the left carrying the grabs $F_1$, $F_2$, $F_3$ and $F_4$ back to their positions round the press 9 at station 3 ready for the next record.

The flash is then removed by rotating cutter blades on the edge trimming machine O, and when this operation is complete, a vacuum grab G, carried by the slide C, is caused to descend by the pneumatic ram 35, until it rests on the surface of the upper record label to which it attaches itself by means of a partial vacuum, and then lifts the record from the turntable 31 of the edge cutting machine O. When the slide C next moves to the right, the record is carried by the grab G to the last station 5, where there is situated the reception means P for receiving the finished record. However, the reception means if desired comprise any convenient form of automatic record packaging means, in which the record is automatically inserted in the record sleeve in which it will ultimately be sold.

It will be understood that the automatic record producing apparatus described with reference to FIGS. 1 and 2, may readily be adapted for producing records of different diameters. Thus claws D and E may be made removable and provided in different sizes, the radial position of the grabs $F_1$, $F_2$, $F_3$ and $F_4$ may be made adjustable, interchangeable compression moulds A and B may be provided and adjustable edge cutting machine O may be employed to adapt the apparatus to different record diameters.

In accordance with the invention the devices described may be combined and their method of operation so matched in space and time to one another that the advantages are obtained of providing a regular working operation requiring little maintenance and above all of speeding up the manufacturing process.

While the invention has been described with reference to a specific embodiment it is not intended that the scope of the invention should be limited thereby. For example, the disposition of components as between stations 1 and 2 may be modified so that both labels are applied to the cake of mouldable material at station 2, by means of vacuum grabs acting on the upper and lower surfaces of the cake presented thereat. In this example the cake would be formed at station 1, by subjecting the mouldable material from below into the jaws of the claw D while at the same time closing the aperture from above by a plate-like device, such as J, which is removed prior to the transfer of the mouldable material to the next station 2, for labelling.

What we claim is:

1. Apparatus for the automatic production of gramophone records comprising a moulding material supply source, a record moulding press, first transfer means for transferring a quantity of moulding material delivered from said supply source to said press, said press being operable to mould a record from said quantity of moulding material, a record edge trimming device, and second transfer means for transferring a moulded record from said press to said trimming device, the improvement consisting of:
    (a) means for delivering said quantity of moulding material to said first transfer means at a position on one side of the press,
    (b) said trimming device including means for receiving a gramophone record from said press at a position on the other side of said press said two positions being equidistant from said press,
    (c) longitudinal slide means supported respectively at the front and rear of said press, said first and second transfer means being supported by said slide means and spaced apart by the distance of said positions from said press,
    (d) means for reciprocating said slide means so that said first and second transfer means can be located at one time at said first position and at said press respectively and at a second time at said press and said trimming device respectively, and
    (e) said press including upper and lower moulds and means for closing and opening said press by moving both said moulds toward and away from each other in a straight line, said moulds when closed being arranged to mould a record substantially in the plane of said first and second transfer means.

2. Apparatus according to claim 1 wherein:
    (a) said second transfer means comprises more than two grab devices which are angularly spaced around said press when said second transfer means is located at said press, and
    (b) said grab devices being arranged to seize the flash extruded from the press when a record is moulded.

3. Apparatus according to claim 2 in which said second transfer means comprises four grab devices arranged so that when said second transfer means is located at said press said grab devices are equi-angularly spaced around the press.

4. Apparatus according to claim 1 in which said first transfer means includes claws which can be moved together to form an enclosure for said quantity of moulding material and can be separated to release said quantity of moulding material to said press.

5. Apparatus acording to claim 1 further comprising:
    (a) delivery means for delivering said quantity of moulding material from said source to said first transfer means including claws which can be moved together to form an enclosure for receiving said quantity of moulding material from said source,
    (b) said claws being supported by said slide means so that when said first transfer means is located at said first position said delivery means is located at said source and when said first transfer means is located at said press said delivery means is located at said first position.

6. Apparatus according to claim 1 including means for causing said quantity of moulding material to adhere to labels before transfer to said press.

7. Apparatus according to claim 5 further comprising a suction device located at said first position to remove said quantity of moulding material from said delivery device and retain it for subsequent delivery to said first transfer means.

8. Apparatus according to claim 6 further comprising:
    (a) means for causing one surface of said quantity of moulding material delivered to said delivery means to adhere to one label, and
    (b) means for turning said delivery means upside down during movement from said source to said first position.

9. Apparatus according to claim 1 including means for removing a record from said trimming device when said second transfer means is located at said press and for transferring said record to a record receiving means when said second transfer means is located at said trimming device.

10. Apparatus for the automatic production of gramophone records comprising a moulding material supply source, a record moulding press, first transfer means for transferring a quantity of moulding material delivered from said supply source to said press, said press being operable to mould a record from said quantity of moulding material, a record edge trimming device, and second transfer means for transferring a moulded record from said press to said trimming device, the improvement consisting of:
 (a) said second transfer means comprising more than two grab devices movable from one location where they are disposed at angularly spaced positions around said press to another location for the delivery of a record to said edge trimming means,
 (b) said grab devices being arranged to seize the flash extruded from the press when a record is moulded, and
 (c) said press including upper and lower moulds and means for closing and opening the said press by moving both said moulds toward and away from each other in a straight line, said moulds when closed being arranged to mould a record substantially in the plane of said grab devices.

References Cited
UNITED STATES PATENTS

| | | | |
|---|---|---|---|
| 1,520,214 | 12/1924 | Thomson | 18—5.3 |
| 1,930,931 | 10/1933 | Fernberg | 18—5.3 XR |
| 2,743,478 | 5/1956 | Harlow et al. | 18—5.3 |
| 3,186,029 | 6/1965 | Joseph | 18—5.3 |
| 3,329,997 | 7/1967 | Rand et al. | 18—5.3 |
| 3,397,425 | 8/1968 | Phillipson et al. | 18—5.3 |

WILLIAM J. STEPHENSON, Primary Examiner

U.S. Cl. X.R.

18—2